Oct. 30, 1962    J. B. O'MALLEY    3,061,095
MACHINE FOR PROCESSING MINERAL MATERIAL
Filed Oct. 10, 1960    5 Sheets-Sheet 1

FIG. 1.

INVENTOR.
JOHN B. O'MALLEY
BY Bertha L. MacGregor
ATTORNEY

Oct. 30, 1962     J. B. O'MALLEY     3,061,095
MACHINE FOR PROCESSING MINERAL MATERIAL
Filed Oct. 10, 1960     5 Sheets-Sheet 3

INVENTOR.
JOHN B. O'MALLEY
BY Bertha L. MacGregor
ATTORNEY

Oct. 30, 1962 J. B. O'MALLEY 3,061,095
MACHINE FOR PROCESSING MINERAL MATERIAL
Filed Oct. 10, 1960 5 Sheets-Sheet 4

INVENTOR.
JOHN B. O'MALLEY
BY Bertha L. M<sup>ac</sup> Gregor
ATTORNEY

Oct. 30, 1962

J. B. O'MALLEY 3,061,095

MACHINE FOR PROCESSING MINERAL MATERIAL

Filed Oct. 10, 1960

INVENTOR.

JOHN B. O'MALLEY

BY Bertha L. MacGregor

ATTORNEY

United States Patent Office 3,061,095
Patented Oct. 30, 1962

1

3,061,095
MACHINE FOR PROCESSING MINERAL
MATERIAL
John B. O'Malley, Denver, Colo., assignor, by mesne assignments, to Process Engineers, Inc., Denver, Colo., a corporation of Colorado
Filed Oct. 10, 1960, Ser. No. 61,443
8 Claims. (Cl. 209—12)

This invention relates to a machine for processing gravel and other mineral bearing materials, including means for thoroughly washing the material, for accurately separating the cleaned material into desired size ranges, for classifying sized material as to weight, and for further processing of the classified material by separation into its basic mineral constituents.

The main object of the invention is to provide mechanism in one machine for selectively performing all or some of the essential functions of processing mineral materials which heretofore have been performed by separate and other mechanisms. The processing machine of my invention performs the washing, screening, classification and concentration of materials in one machine by utilizing the inertial effect of different specific gravity equal sized materials when subjected selectively to any one or any combination of the following: gravity, centrifugal and hydraulic flow forces correctly balanced, hindered settling, density, chemical combination and magnetic attraction.

Another object of the invention is to provide interchangeable means for performing all or some of the essential functions of processing mineral material in one machine in a continuous operation.

Among the novel features of construction of the machine of this invention is the provision of a highly efficient water distribution system for use in thoroughly washing the material to be processed to remove clay and other foreign matter therefrom, for use in classification processes, and for discharging classified and concentrated material.

Another novel feature of construction of my machine is the provision of a multi-screen assembly which is simultaneously and rhythmically rotated and vertically reciprocated, radially surrounded by a plurality of superposed separate detachably connected annular box-form troughs stationarily mounted on a stationary tank or support, one trough being operatively associated with each screen of the multi-screen assembly. The construction is such that the box-form troughs are interchangeable and may be adapted for different functions in an assembled machine for selectively performing some or all of the essential steps of washing, screening material as to size, classifying by a choice of methods the sized material as to weight, and concentrating and separating classified material with respect to its basic components.

The several annular troughs of one machine embodying my invention may be employed to perform the same function, as for example, to receive sized and weight-classified material from an associated screen, the several screens of the machine being of different mesh. The several annular troughs of one machine may be employed to perform different functions, as for example, one trough may be utilized to receive sized material and to classify it by jigging, a procedure in which hindered settlement through bedding material is employed; another trough may be utilized to receive sized material and to classify it by a sink-float method in which heavy density fluid is employed. Still another trough may be utilized to receive sized material and to separate it into its components by amalgamation or other means. The screens and box-form troughs hereinafter described may be selectively

2 assembled into one machine to best serve the requirements of a particular installation.

Due to the form, construction and interchangeability of the annular box-form troughs of my invention, the processing machine can be arranged quickly and easily for selectively performing the following functions: (1) washing and sizing only; (2) washing, sizing and gravity concentration through jig action; (3) washing, sizing and gravity concentration through sink-float action; (4) washing, sizing, gravity concentration through jig action and magnetic concentration; (5) washing, sizing, gravity concentration through sink-float action and magnetic concentration; (6) washing, sizing, gravity concentration through jig action, sink-float action and magnetic concentration; (7) washing, sizing, chemical concentration through amalgamation; and (8) washing, sizing, gravity concentration through jig action and chemical concentration through amalgamation.

The combining in one machine of means for performing the multiple operations described results in lower first cost, lower operating cost, less floor space required, reduced foundation requirements, elimination of support framing, fewer and shorter launders, less piping, lower water requirements, greater capacity and greater efficiency as compared to known constructions heretofore required to perform the essential processing steps.

The novel arrangement of separate annular troughs connected together in vertically spaced apart relationship, by means located externally of the troughs, permits detachment by external manipulation, and also enables the operator to visually inspect the contents of the troughs without interrupting the operation. The troughs are made in segments, preferably four for each trough, which permits removal of one or two of the four segments from any of the superposed troughs without disturbing the remaining troughs or segments.

Referring to the embodiment of the invention shown in FIGS. 1 to 4, inclusive, the processing machine comprises a base 10, center support 11, motor and gear housing 12, motor 13, reduction gear box and contents 14, eccentric 15 on a horizontal shaft, and belts 16, 17 operatively connecting the motor to mechanism in the gear box 14 for rotating the eccentric shaft. A vertical center post 20, 20', provided with teeth 21, is rotated by the gearing in the box 14 and reciprocated by the eccentric 15, whereby rhythmic rotary and vertically reciprocatory motion is transmitted to the center post 20 and parts mounted thereon.

Figure 1:
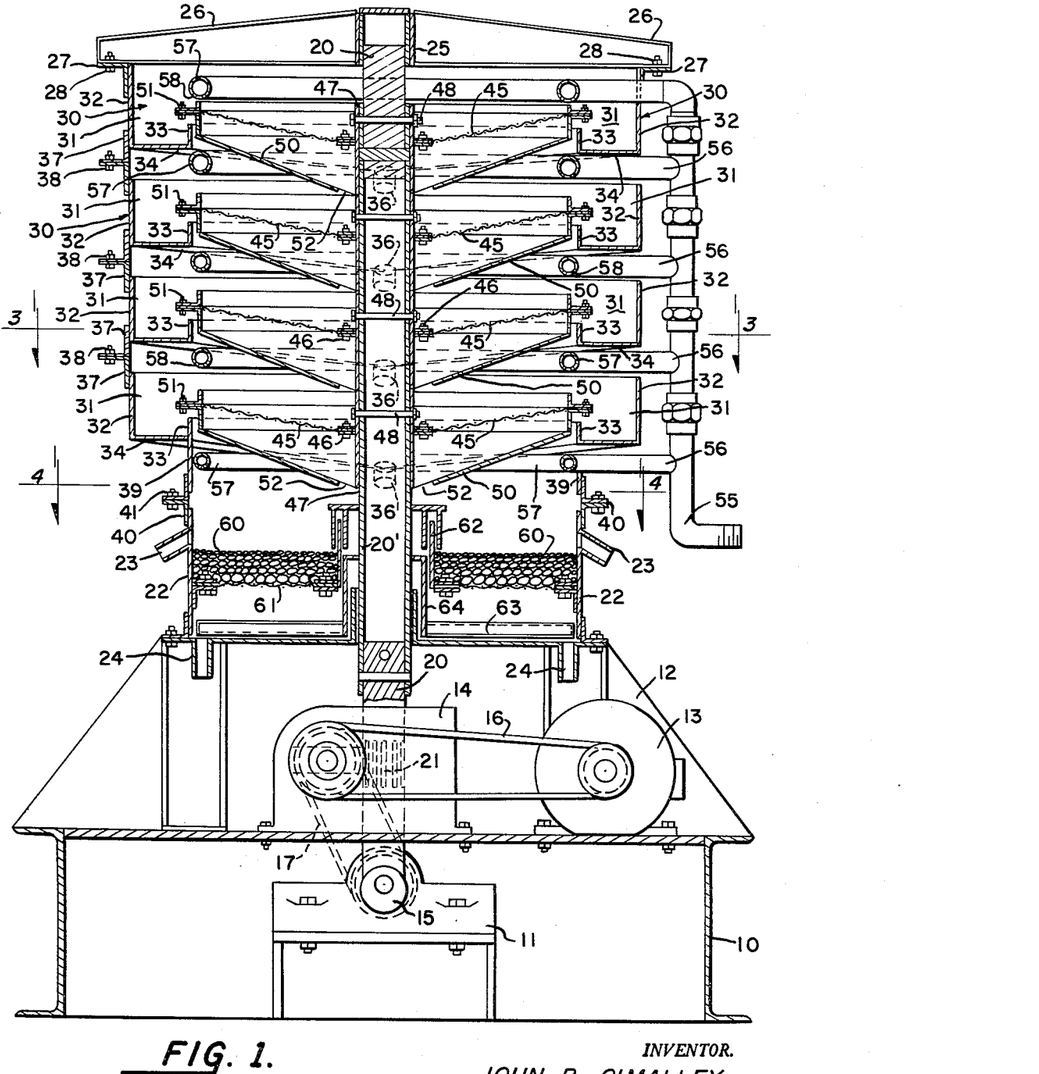
FIG. 1 is a vertical sectional view, partly in elevation, of a processing machine embodying my invention, designed for washing, successive screening, and classifying of material by centrifugal action, followed by a jigging or hindered settlement procedure.

A circular tank 22 is mounted stationarily on the housing 12. The tank is provided with ports 23 in its side walls and ports 24 in its bottom. The center post 20, preferably made partly solid and partly tubular as indicated at 20', extends upwardly from the base support 11, slidably through the tank 22, the upper end of the post being slidably mounted in a bearing 25 supported in a spider 26. Angle members 27 and bolts 28 connect the spider 26 to an annular box-form multiple trough assembly indicated as a whole at 30.

Figures 2, 3, 4:
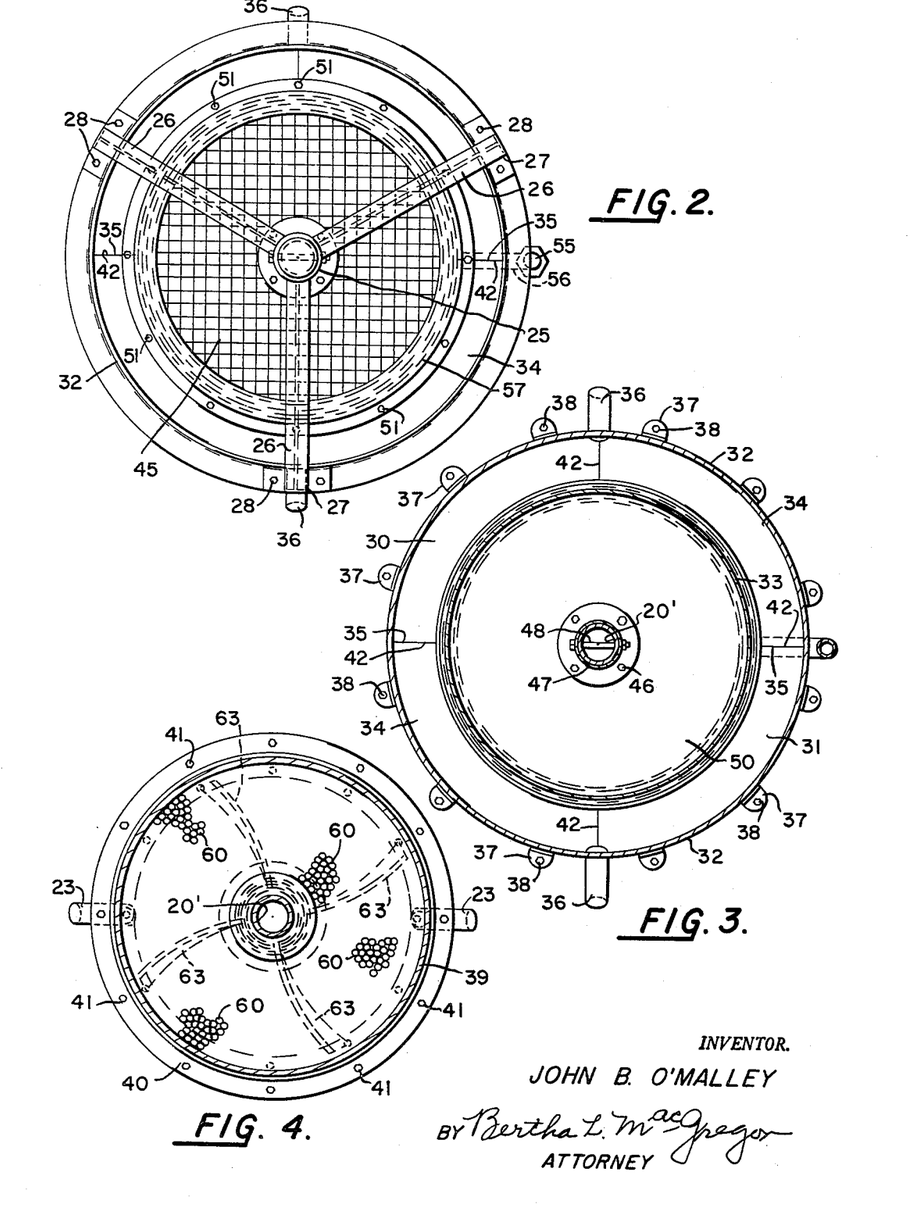
FIG. 2 is a plan view of the machine shown in FIG. 1.
FIGS. 3 and 4 are horizontal sectional views in the planes of the lines 3—3 and 4—4, respectively, of FIG. 1.

In this embodiment of the invention, four annular box-form troughs 31 are superposed concentrically relatively to the center post 20. Each trough comprises a peripheral outer vertical wall 32, a shorter inner vertical wall 33 parallel to the wall 32, and a bottom 34 which slopes downwardly from oppositely located high areas 35 to discharge outlets 36, as shown in FIGS. 1 and 3. The several annular troughs 31 are spaced apart vertically and are rigidly but detachably connected together in spaced relationship by annularly shaped angle bars 37 connected to the walls 32 and bolts 38 extending through the angle bars. By removing bolts 38, the several annular troughs 31 can be quickly detached, removed, interchanged or replaced by other troughs for purposes explained hereinafter.

The inner annular wall 33 of the lowermost trough 31 extends downwardly below the bottom 34 of that trough, as indicated at 39, for detachable connection to the side walls of the tank 22 by angle bars 40 and bolts 41. The troughs 31 preferably are made in segments, as indicated by the lines 42, and if four segments are used in making one annular trough, either one or two segments can be removed and replaced without disturbing any other trough or segment.

The tank 22 and multi-trough assembly form a stationary peripheral unit which surrounds a plurality of screens 45 of different mesh and transfer plates 50 mounted on and rotatable and reciprocable with the center post 20. A screen 45 is provided for cooperation with each trough 31, the peripheral edge of each screen being located adjacent and slightly above the inner annular wall of a trough 31. Each screen is shallow cone shaped, sloping downwardly from its peripheral edge toward the center where the screen is connected by bolts 46 to a sleeve 47 which surrounds the center post and is connected thereto by bolts 48. Each screen is connected to a transfer plate 50 by bolts 51. The transfer plates also are shallow cone shaped but inclined at a slightly greater angle than the screens with which they are associated. Each plate 50 is provided with a central opening 52 larger than the diameter of the center post 20 and sleeve 47 thereon to allow material being processed to pass downwardly on the transfer plates and fall through the openings 52 to the subjacent screen 45. The screens and transfer plates rotate with and are reciprocated by the post 20.

Figure 11:
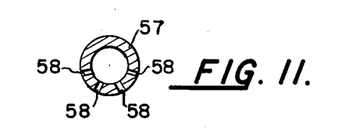
FIG. 11 is a transverse vertical sectional view through one of the annular water conduits, showing the arrangement of a group of ports for discharging water.

A water distribution system is designed to perform several functions, including thorough washing of material on screens 45, treatment of material for various purposes in the annular troughs 31, and carrying off and discharging of treated material from said troughs and from the tank 22. Water is supplied through an intake pipe 55 from which it flows under pressure to a series of horizontal pipes 56 each of which leads into an annular conduit 57 of such diameter that the conduit is located above the peripheral edge of a screen 45 near the inner wall 33 of a trough 31. Each annular conduit 57 is provided with numerous groups of apertures 58, the number of groups depending on the size of the machine. Usually about seventy two of such groups of apertures 58 are equally spaced apart in a conduit 57. Each group 58 comprises two or more apertures arranged at different angles. In FIG. 11, four apertures are arranged so that some of the water sprayed therethrough under pressure will be directed into a trough 31 and some will be sprayed onto a screen 45 to meet material moving upwardly toward the peripheral edge of the screen under centrifugal force. The water system piping is independent of the rest of the structure, the annular conduits 57 extending horizontally into the spaces above the several troughs 31. The troughs thus may be detached and moved without disturbing the water lines.

The machine hereinabove described and shown in FIGS. 1–4 is a multi-screening and classifying model whereby gravel and other mineral material is screened to separate it into different size ranges and sized material is classified as to weight by centrifugal action of the rotated reciprocated screens, combined with further classification of the finest material by a hindered settlement procedure known in the art as jigging. Material to be processed is fed to the uppermost screen 45 from which the oversize is propelled by centrifugal action into the uppermost trough 31. Undersize passes from the uppermost screen to the transfer plate 50 beneath it, slides downwardly by gravity assisted by flow of water through the screen, down the transfer plates 50, and drops through the opening 52 to the subjacent screen where reciprocation and rotation cause the material to move upwardly and outwardly under centrifugal force, the oversize of that screen being propelled into its associated trough 31. The annular conduits 57 direct water to flow through the screens at their peripheral edges, and this water sweeps and maintains the transfer plate surfaces clean.

The screens 45 are made of progressively smaller mesh, from top to bottom, so that the different oversize ejected from each screen has been classified as to weight when it reaches the trough associated with that screen. The smallest screened material which drops through the central opening 52 of the lowermost transfer plate 50 falls into the tank 22 which, in this embodiment, is provided with permanent lead shot bedding material 60 supported on a stationary screen 61. This jigging material 60 and the screen 61 are confined between the walls of the tank 22 and an inner vertical concentric wall 62 whereby a jigging area is provided. A vaned impeller 63 at the bottom of the tank rotates with the post 20 through the mounting 64. Undersize which passes through the bedding 60 and settles in the tank is discharged through ports 24 while oversize above the bedding 60 passes out through side wall ports 23.

While the center post and screen assembly are being rotated and reciprocated, hydraulic fluid, liquid or gas, is forced under pressure through the annular conduits 57 onto screens 45 and into troughs 31 and tank 22. Material moving upwardly radially under centrifugal force on screens 45 is thoroughly washed by meeting the water sprayed toward it. Oversize classified material propelled into the troughs from each screen is carried downwardly with the fluid passing over the inclined bottoms of the troughs to the discharge openings 36. The smallest classified material is subjected to final classification by jigging action in the tank 22 by water passing through the bed 60, up and down, by action of the vaned impeller 63. Thus several separations of material as to size and weight within predetermined ranges are achieved in one machine in a continuous operation.

Figure 5:
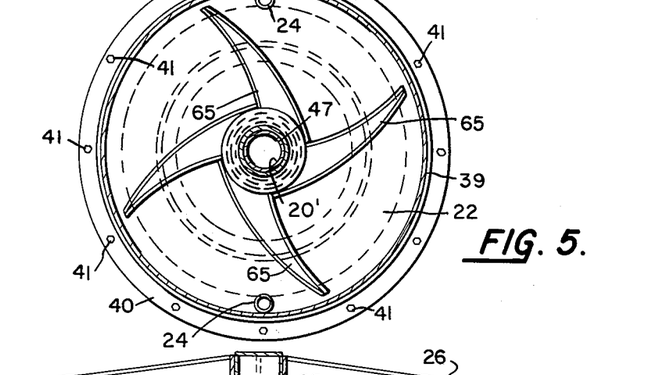
FIG. 5 is a sectional view similar to FIG. 4, showing a modification of part of the structure of FIG. 1.

For processing of sand and gravel, the jigging procedure performed by use of the bedding 60 in the tank 22 of the machine shown in FIG. 1 may be omitted, but for this modification I prefer to substitute a vaned impeller 65 as shown in FIG. 5 for the impeller 63 shown in FIGS.

1 and 4, at the bottom of tank 22. The impeller 65 efficiently propels undersize from the bottom screen 45 out of the tank 22 through ports 24.

Figure 6:
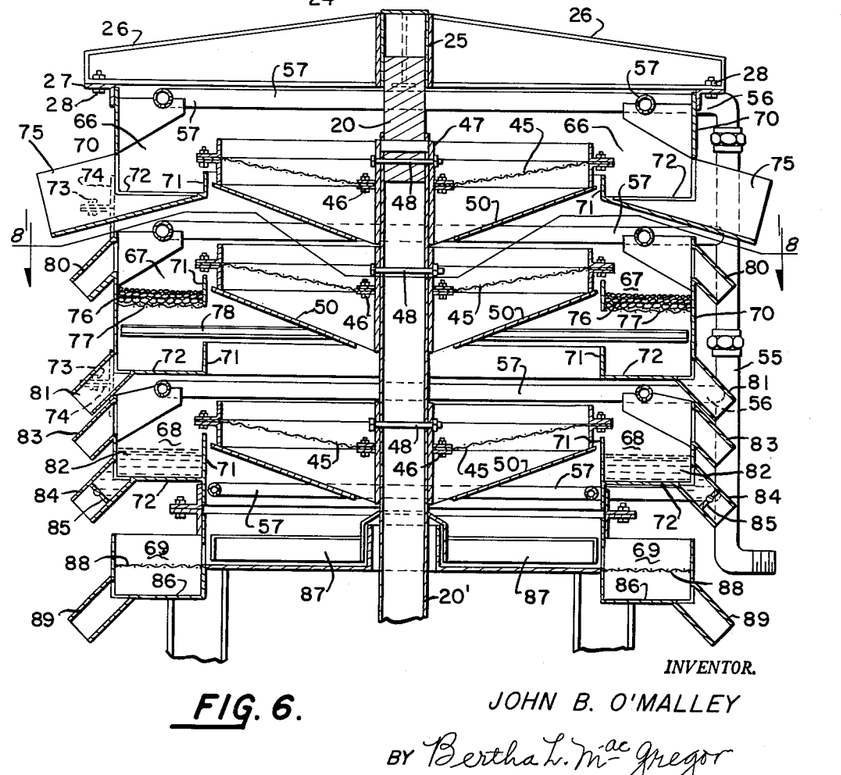
FIG. 6 is a vertical sectional view, partly in elevation, showing a composite model embodying my invention, designed for washing, screening, classifying of material by centrifugal action, followed by a jigging and/or sink-float procedure, and separation of material into components by amalgamation; the power transmitting means of FIG. 1 having been omitted in this view.
Figure 7:
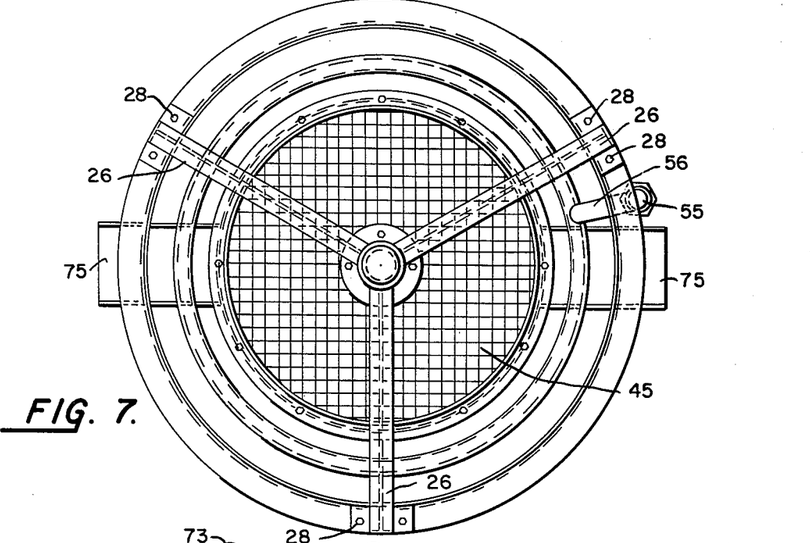
FIG. 7 is a plan view of the machine of FIG. 6.
Figure 8:
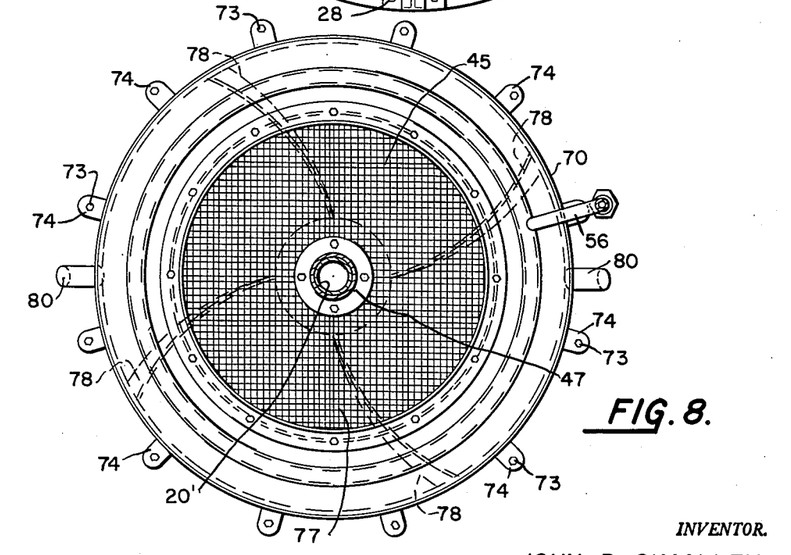
FIG. 8 is a horizontal sectional view in the plane of the line 8—8 of FIG. 6.

In FIGS. 6, 7 and 8, is shown a processing machine which is a composite model for screening, classifying by centrifugal action of rotating screens, classifying by jigging and/or by separation in heavy media, and chemical combination by amalgamation. This machine also embodies the rotated and reciprocated center post 20, screens 45 and transfer plates 50 mounted on the post. The motor and operative mechanism shown in FIG. 1 may be employed for actuating the post 20.

In place of annular box-form troughs 31, heretofore described, the composite machine embodies troughs 66, 67, 68 and 69, respectively, each comprising annular vertical spaced apart walls 70, 71, and flat bottoms 72. The several vertically spaced apart troughs are connected together by bolts 73 extending through the angle bars 74 fastened to the outer walls of the troughs. Like the troughs 31, they are separate, open topped, accessible externally of the machine for inspection, and detachable and interchangeable.

The upper trough 66 is designed to receive oversize from the upper screen 45 by virtue of centrifugal action of the screen and to discharge it through spouts 75. The subjacent annular trough 67 is provided with bedding material 76 arranged in graded layers supported on screen 77 to furnish jig area for hindered settling to classify material received from the second screen. Hydraulic fluid is raised and lowered through the bedding 76 by vaned impellers 78 mounted on the transfer plate associated with said second screen. Light material in the size being jigged flows out of the annular trough 67 through spouts 80 and heavy material in the size being jigged flows down through the bedding 76 and screen 77 and is discharged through ports 81.

The next subjacent trough 68 is designed to furnish area for sink-float processing. Heavy density fluid 82 is contained in this trough to effect removal of light material from the top by hydraulic flow through ports 83. Heavy material passes through the heavy density fluid 82 and out through the lower ports 84 which are provided with valve gates 85 to prevent the fluid from passing out of the trough 68 before the material being processed has reached the trough for sink-float treatment. The trough 68 is designed to provide for reclamation of the heavy density material by using conventional chemical, recirculation, washing or magnetic methods.

The lowermost annular trough 69 is designed for chemical combination of mineral material on amalgamation plates 86 on which material is introduced through distribution screen 88 by impeller blades 87. Discharge is through ports 89.

The jig trough 67 and sink-float trough 68 may be employed for magnetic concentration of material by substitution of magnetic concentrating equipment therein.

In the processing machine shown in FIG. 6, referred to herein as the composite model, the water distribution system 55, 56, 57 closely resembles the system heretofore described in connection with FIG. 1, but the annular conduits 57 are of such diameter and so located that the discharge openings 58 are above the respective annular troughs 66, 67, 68 and 69. Part of the spray from the discharge openings 58 is directed to the screen 45 associated with each of said annular troughs, to meet the centrifugally influenced oncoming material, and part of the spray is directed into the annular troughs for performing the several functions heretofore described.

Figure 9:
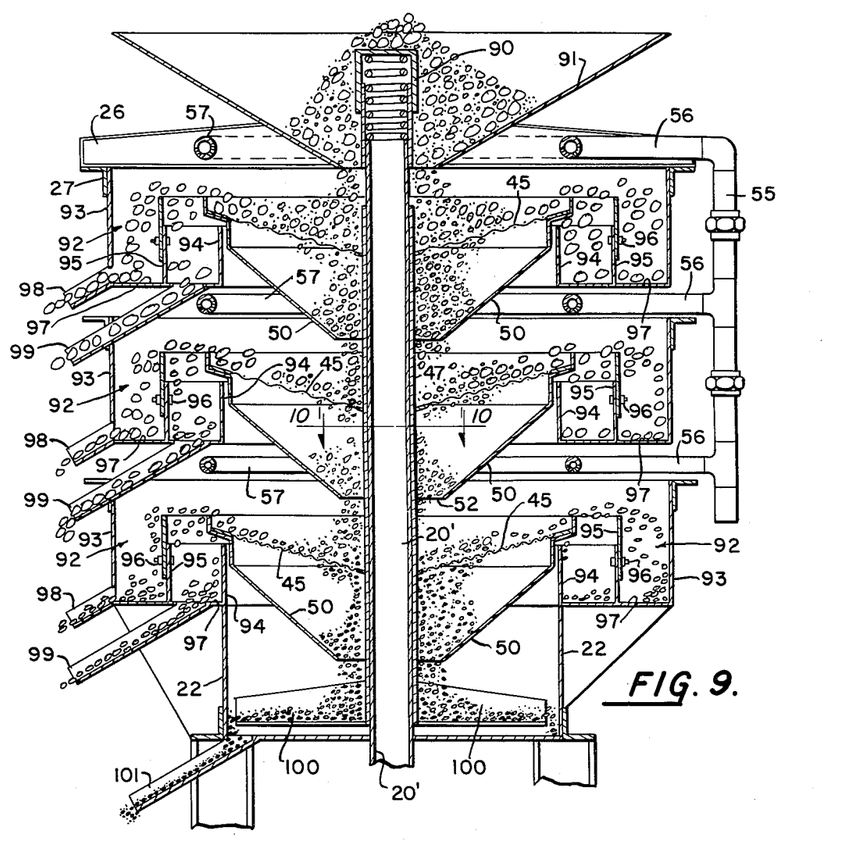
FIG. 9 is a vertical sectional view, partly in elevation, showing another modification of my invention, designed for washing and multiple screening and classification of material; the power transmitting means of FIG. 1 having been omitted from this view.
Figure 10:
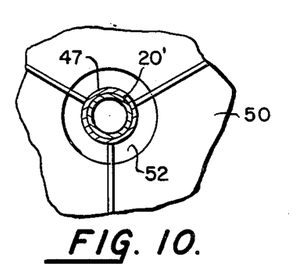
FIG. 10 is a horizontal sectional view of a detail of the transfer plates construction, in the plane of the line 10—10 of FIG. 9.

Still another modification of the invention is the embodiment shown in FIG. 9, designed for washing, sizing and classifying of mineral material from a grizzly or crusher. The center post 20 is rotated and reciprocated by the mechanism described in connection with FIG. 1. The upper end of the center post preferably is mounted in a spring holding bearing 90 centrally of a hopper 91 through which material to be processed is fed to the screens 45. Three screens 45 are shown, the uppermost screen of larger mesh than the subjacent screen, and the lowermost screen of smallest mesh. The novel feature of this modification is the provision of adjustable classifying weirs in the annular box-form troughs 92, which are identical in construction, comprising radially spaced apart vertical walls 93, 94, and an intermediate classifying weir 95 in the form of a two part annular vertical wall adjustable as to height as indicated at 96, supported by bottom 97. Each of the two annular chambers thus formed in the annular troughs 92 is provided with a discharge port or spout, the outer chamber port 98 for light product and the inner annular chamber port 99 for heavy product separated from the particular sized material propelled from the associated screen 45. Material screened through the lowermost screen drops to the lower transfer plate and then into the tank 22 from which it is moved by impeller 100 out through ports 101.

The water distribution system employed in the machine shown in FIG. 9 is similar to those heretofore described, the annular conduits 57 associated with each superposed section of the machine being located and arranged so that part of the spray discharged from the apertures 58 is directed toward the material which moves by centrifugal force upwardly and outwardly on the screen, and part of the spray is directed into the annular troughs 92 into contact with the classified material in both the inner and outer annular chambers of each trough at opposite sides of the adjustable weir 95.

Preferably the annular conduits 57 located at different levels of the system between the superposed sections of the machines are made of different diameter piping for the purpose of obtaining greater pressure in the water directed against the small material than that directed against the heavier, coarser material. For this purpose, I have shown the lowermost conduit 57 smaller in diameter than the upper conduits 57.

The combination of a central rotated and reciprocated screen assembly with a stationary outer annular box-form trough assembly provides an exceedingly stable machine in which the functions of multiscreening and classifying by different selective methods are performed most economically and efficiently in one machine in a continuous operation. The making of the machine in superposed vertically spaced apart sections and provision of an annular water distribution conduit for each section but structurally independent of the annular troughs as well as structurally independent of the rotatable and reciprocated screen assembly, produces substantial economies in initial cost and operation and also permits of detachment, removal and replacement of the annular troughs or segments thereof without disturbing the water lines.

The fact that the troughs are open topped, spaced from superposed troughs, and the contents of the troughs can be inspected visually from the exterior of the machine is an important advantage. For example, lead and zinc or other content of mineral material being processed may vary from time to time during a run, and by visual inspection determination by color of the presence of certain components may be established.

Another advantage resulting from the provision of separate annular troughs vertically spaced apart and connected by detachable means in such spaced apart relationship, each trough being made in segments, preferably four in number, is that it is possible to remove a trough below the uppermost trough without disturbing any of the others, by first detaching and removing two of the four segments, replacing them by others fastened in place, and then detaching and removing the remaining two segments and replacing them with others, either for repair purposes, installation of different equipment, or for other reasons.

Changes may be made in the form and arrangement of parts and in details of construction without departing from

I claim:

1. A machine for processing mineral material by selectively performing some or all of the steps of washing, screening, classifying and concentrating of mineral material in a continuous operation, said machine comprising
   (a) a stationary support,
   (b) an upright post rising from the support,
   (c) means imparting simultaneous rotary and reciprocating motion to said post,
   (d) a plurality of concentric, inverted cone shaped screens and subjacent transfer plates mounted on and rotated with the post,
   (e) a plurality of separate, stationary, concentric, annular, open top superposed troughs each located in fixed position radially outwardly of and adjacent the peripheral edge of a screen to receive material by centrifugal action from said screen,
   (f) means for classifying previously sized material removably located in at least one of said troughs,
   (g) said screens being free of any trough-entering part,
   (h) circumferentially spaced apart means accessible externally of the troughs detachably connecting the troughs to each other in fixed vertically spaced relationship,
   (i) passageways extending from the exterior to the interior of the machine between said superposed troughs and between said trough connecting means for access to the interior for repairs and for inspection of trough contents as deposited by said screens, and
   (j) means in each trough for discharging processed material therefrom.

2. A machine for processing mineral material by selectively performing some or all of the steps of washing, screening, classifying and concentrating of mineral material in a continuous operation, said machine comprising
   (a) a stationary support,
   (b) an upright post rising from the support,
   (c) means imparting simultaneous rotary and reciprocating motion to said post,
   (d) a plurality of concentric, inverted cone shaped screens and subjacent transfer plates mounted on and rotated with the post,
   (e) a plurality of separate, stationary, concentric, annular, open top superposed troughs each located in fixed position radially outwardly of and adjacent the peripheral edge of a screen to receive material by centrifugal action from said screen,
   (f) one of said troughs having a fluid pervious bottom and jigging material supported on said bottom,
   (g) said screens being free of any trough-entering part,
   (h) circumferentially spaced apart means accessible externally of the troughs detachably connecting the troughs to each other in fixed vertically spaced relationship,
   (i) passageways extending from the exterior to the interior of the machine between said superposed troughs and between said trough connecting means for access to the interior for repairs and for inspection of trough contents as deposited by said screens, and
   (j) means for discharging processed material from said jigging material-containing trough comprising a port located above the level of the jigging material and another port located below the jigging material.

3. A machine for processing mineral material by selectively performing some or all of the steps of washing, screening, classifying and concentrating of mineral material in a continuous operation, said machine comprising
   (a) a stationary support,
   (b) an upright post rising from the support,
   (c) means imparting simultaneous rotary and reciprocating motion to said post,
   (d) a plurality of concentric, inverted cone shaped screens and subjacent transfer plates mounted on and rotated with the post,
   (e) a plurality of separate, stationary, concentric, annular, open top superposed troughs each located in fixed position radially outwardly of and adjacent the peripheral edge of a screen to receive material by centrifugal action from said screen,
   (f) one of said troughs comprising a fluid-retaining bottom and side walls and heavy density fluid in said trough,
   (g) said screens being free of any trough-entering part,
   (h) circumferentially spaced apart means accessible externally of the troughs detachably connecting the troughs to each other in fixed vertically spaced relationship,
   (i) passageways extending from the exterior to the interior of the machine between said superposed troughs and between said trough connecting means for access to the interior for repairs and for inspection of trough contents as deposited by said screens, and
   (j) means for discharging processed material from said heavy density fluid-containing trough comprising a port located above the level of the fluid and a valved port located below the high density fluid.

4. A machine for processing mineral material by selectively performing some or all of the steps of washing, screening, classifying and concentrating of mineral material in a continuous operation, said machine comprising
   (a) a stationary support,
   (b) an upright post rising from the support,
   (c) means imparting simultaneous rotary and reciprocating motion to said post,
   (d) a plurality of concentric, inverted cone shaped screens and subjacent transfer plates mounted on and rotated with the post.
   (e) a plurality of separate, stationary, concentric, annular, open top superposed troughs each located in fixed position radially outwardly of and adjacent the peripheral edge of a screen to receive material by centrifugal action from said screen,
   (f) one of said troughs having an amalgamation plate in its bottom and a distribution screen above said plate,
   (g) said screens being free of any trough-entering part,
   (h) circumferentially spaced apart means accessible externally of the troughs detachably connecting the troughs to each other in fixed vertically spaced relationship,
   (i) passageways extending from the exterior to the interior of the machine between said superposed troughs and between said trough connecting means for access to the interior for repairs and for inspection of trough contents as deposited by said screens, and
   (j) means for discharging processed material from said amalgamation plate-containing trough comprising a port located below the plate.

5. A machine for processing mineral material by selectively performing some or all of the steps of washing, screening, classifying and concentrating of mineral material in a continuous operation, said machine comprising
   (a) a stationary support comprising a cylindrical open top tank,
   (b) an upright post rising from the support,
   (c) means imparting simultaneous rotary and reciprocating motion to said post,
   (d) a plurality of concentric, inverted cone shaped screens and subjacent transfer plates mounted on and rotated with the post,
   (e) a plurality of separate, stationary, concentric, annular, open top superposed troughs each located in fixed position radially outwardly of and adjacent the peripheral edge of a screen to receive material by centrifugal action from said screen, (f) a fluid pervious screen located above the bottom of the tank and jigging material on the screen, (g) said screens being free of any trough-entering part, (h) circumferentially spaced apart means accessible externally of the troughs detachably connecting the troughs to each other in fixed vertically spaced relationship, (i) passageways extending from the exterior to the interior of the machine between said superposed troughs and between said trough connecting means for access to the interior for repairs and for inspection of trough contents as deposited by said screens, and (j) means in each trough for discharging processed material therefrom, (k) and ports located respectively above the level of the jigging material in the tank and below said material for discharge of processed material from the tank.

6. A machine for processing mineral material by selectively performing some or all of the steps of washing, screening, classifying and concentrating of mineral material in a continuous operation, said machine comprising (a) a stationary support, (b) an upright post rising from the support, (c) means imparting simultaneous rotary and reciprocating motion to said post, (d) a plurality of concentric, inverted cone shaped screens and subjacent transfer plates mounted on and rotated with the post, (e) a plurality of separate, stationary, concentric, annular, open top superposed troughs each located in fixed position radially outwardly of and adjacent the peripheral edge of a screen to receive material by centrifugal action from said screen, (f) a pressurized water distribution system comprising a plurality of branch lines at different levels and concentric superposed conduits communicating with said branch lines, each of said conduits extending annularly above and near the periphery of the screen and being provided with discharge openings which direct pressurized water toward the machine center to meet material moving radially upwardly and outwardly by centrifugal action on the screen and direct pressurized water to pass through the screens to the subjacent transfer plates to sweep and maintain said transfer plate surfaces clean, (g) said screens being free of any trough-entering part, (h) circumferentially spaced apart means accessible externally of the troughs detachably connecting the troughs to each other in fixed vertically spaced relationship, (i) passageways extending from the exterior to the interior of the machine between said superposed troughs and between said trough connecting means for access to the interior for repairs and for inspection of trough contents as deposited by said screens, and (j) means in each trough for discharging processed material therefrom, (k) one of said troughs having a fluid pervious bottom and jigging material supported on said bottom for classifying previously sized and classified material.

7. A machine for processing mineral material by selectively performing some or all of the steps of washing, screening, classifying and concentrating of mineral material in a continuous operation, said machine comprising (a) a stationary support, (b) an upright post rising from the support, (c) means imparting simultaneous rotary and reciprocating motion to said post, (d) a plurality of concentric, inverted cone shaped screens and subjacent transfer plates mounted on and rotated with the post, (e) a plurality of separate, stationary, concentric, annular, open top superposed troughs each located in fixed position radially outwardly of and adjacent the peripheral edge of a screen to receive material by centrifugal action from said screen, (f) a pressurized water distribution system comprising a plurality of branch lines at different levels and concentric superposed conduits communicating with said branch lines, each of said conduits extending annularly above and near the periphery of the screen and being provided with discharge openings which direct pressurized water toward the machine center to meet material moving radially upwardly and outwardly by centrifugal action on the screen and direct pressurized water to pass through the screens to the subjacent transfer plates to sweep and maintain said transfer plate surfaces clean, (g) said screens being free of any trough-entering part, (h) circumferentially spaced apart means accessible externally of the troughs detachably connecting the troughs to each other in fixed vertically spaced relationship, (i) passageways extending from the exterior to the interior of the machine between said superposed troughs and between said trough connecting means for access to the interior for repairs and for inspection of trough contents as deposited by said screens, and (j) means in each trough for discharging processed material therefrom, (k) one of said troughs comprising a fluid-retaining bottom and side walls and sink-float means in said trough for classifying previously sized and classified material.

8. A machine for processing mineral material by selectively performing some or all of the steps of washing, screening, classifying and concentrating of mineral material in a continuous operation, said machine comprising (a) a stationary support, (b) an upright post rising from the support, (c) means imparting simultaneous rotary and reciprocating motion to said post, (d) a plurality of concentric, inverted cone shaped screens and subjacent transfer plates mounted on and rotated with the post, (e) a plurality of separate, stationary, concentric, annular, open top superposed troughs each located in fixed position radially outwardly of and adjacent the peripheral edge of a screen to receive material by centrifugal action from said screen, (f) a pressurized water distribution system comprising a plurality of branch lines at different levels and concentric superposed conduits communicating with said branch lines, each of said conduits extending annularly above and near the periphery of the screen and being provided with discharge openings which direct pressurized water toward the machine center to meet material moving radially upwardly and outwardly by centrifugal action on the screen and direct pressurized water to pass through the screens to the subjacent transfer plates to sweep and maintain said transfer plate surfaces clean, (g) said screens being free of any trough-entering part, (h) circumferentially spaced apart means accessible externally of the troughs detachably connecting the troughs to each other in fixed vertically spaced relationship, (i) passageways extending from the exterior to the interior of the machine between said superposed troughs and between said trough connecting means for access to the interior for repairs and for inspection of trough contents as deposited by said screens, and (j) means in each trough for discharging processed material therefrom, (k) one of said troughs having an amalgamation plate in its bottom and a distribution screen above said plate for concentration of previously sized and classified material.

References Cited in the file of this patent

UNITED STATES PATENTS

| | | |
|---|---|---|
| 753,440 | Spencer | Mar. 1, 1904 |
| 838,441 | Nichter | Dec. 11, 1906 |
| 1,284,095 | Gruender | Nov. 5, 1918 |
| 1,556,676 | Chance | Oct. 13, 1925 |
| 1,595,621 | Robbins | Aug. 10, 1926 |
| 1,996,190 | Buck | Apr. 2, 1935 |
| 2,052,431 | Wade | Aug. 25, 1936 |
| 2,125,469 | Ulrich | Aug. 2, 1938 |
| 2,183,971 | Miller | Dec. 19, 1939 |
| 2,714,961 | Miller et al. | Aug. 9, 1955 |